Aug. 5, 1958     E. J. THOMECZEK     2,845,828

WORK HOLDER

Filed Dec. 30, 1954

INVENTOR.
EUGENE J. THOMECZEK
BY Tom Walker

United States Patent Office 2,845,828
Patented Aug. 5, 1958

2,845,828

WORK HOLDER

Eugene J. Thomeczek, Dayton, Ohio

Application December 30, 1954, Serial No. 478,827

1 Claim. (Cl. 82—31)

This invention relates to work holders and more particularly to what is known in the trade as toggle shoe clamps. Such clamps are used in various ways for the holding or clamping of irregularly shaped work pieces so that further work or machining may be done thereon. While clamps of similar nature have heretofore been known such clamps have certain disadvantages in that they are not easily adjusted to various angular positions, or that the pad or cap is a permanent part of the holder. Such known clamps require a machine operation in order to secure the tip or pad to the holder shaft and if marred or defaced require factory repair. Furthermore, the tips or caps on such known holders cannot be easily replaced by the user so as to provide different sizes when needed. It is furthermore impossible to harden or heat treat the pads or caps of presently known clamps prior to assembly since the pads cannot then be deformed as is required to assemble the pad to the clamp. All of these disadvantages have been overcome by the presently disclosed toggle shield clamp without in any way increasing the size, complexity or cost thereof.

The object of the invention is to simplify the construction as well as the means and mode of operation of work holders, whereby such holders may not only be economically manufactured, but will be more efficient and satisfactory in use, adaptable to a wide variety of applications, and be unlikely to get out of order.

A further object of the invention is to provide a work holder having a freely rotatable pad or cap which is universally movable both about the axis of the holder and also about axes disposed in angular relation thereto.

A further object of the invention is to provide a work holder in which the freely rotatable pad or cap may be easily removed and replaced thereon.

A further object of the invention is to provide a work holder of the type described in which the rotatable cap has direct thrust engagement upon its supporting stem.

A further object of the invention is to provide a work holder of the type described, a structure which will permit the use of pads or caps, which are very little larger in diameter than the diameter of the supporting member.

A further object of this invention is to provide a work holder which is of universal nature in that it may be used to clamp work pieces of varying shapes and sizes having inclined or angularly disposed surfaces.

A further object of the invention is to provide a work holder in which the pad or cap may be easily replaced by the user and which will not require factory installation.

A further object of the invention is to provide a work holder which is adaptable to a wide variety of uses simply by substitution of one of a plurality of pads or caps for the end thereof.

A further object of the invention is to provide a work holder possessing the advantageous structural features, the inherent meritorious characteristics and the mode of operation herein described.

With the above primary and other incidental objects in view as will more fully appear in the specification, the invention intended to be protected by Letters Patent consists of the features of construction, the parts and combinations thereof, and the mode of operation as hereinafter described or illustrated in the accompanying drawings, or their equivalents.

Referring to the accompanying drawing wherein is shown several, but obviously not necessarily the only forms of embodiment of the invention, Fig. 1 is a view, partly schematic, showing the work holder installed and in use;

Like parts are indicated by similar characters of reference throughout the several views.

Figure 1:
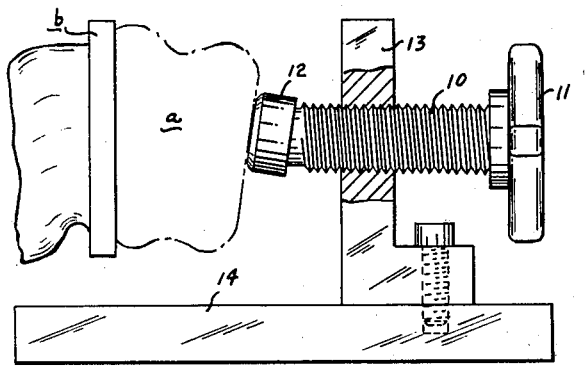
Figure 2:
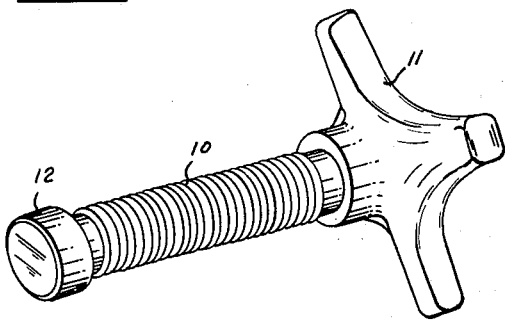
Fig. 2 is a perspective view of the work holder comprising the subject matter of this invention.

Referring to the drawing there is shown in Fig. 1 a typical installation of work holder comprising the subject matter of the present invention. In this view the work holder comprises a screw shaft 10 having at one end thereof a hand wheel 11 and at the opposite end thereof a pad or cap 12. The shaft 10 is supported in a bracket 13 for threaded adjustment relative thereto so as to move the cap 12 into or out of engagement with a work piece designated generally as *a*. For illustrative purposes the work holder has been shown herein as applied to a lathe in which the work piece *a* is supported upon a face plate *b* of the lathe with the support 13 being fixed in adjusted position upon the bed 14 of the lathe. The support 13 is so adjusted relative to the work piece *a* that the work holder 10 may be withdrawn sufficiently far from the work piece so as to clear it for removal and insertion of another work piece. It will be noted that the surface with which the cap 12 has engagement is angularly disposed with respect to the axis of the base plate *b* of the lathe and also the axis of the work holder 10.

This particular view shows the universal nature of the present work holder and its adaptability to various types of jobs. In the installation shown in Fig. 1 the work piece *a* is revolved upon the lathe and the cap 12 of the work holder 10 must not only revolve on the shaft 10 but must also continuously change its angular relation with respect to the shaft 10 during its rotation.

Figure 3:
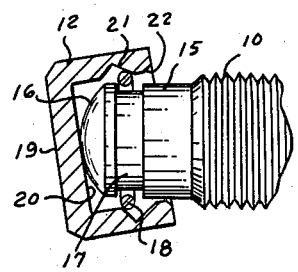
Fig. 3 is a fragmentary view partly in section, showing the details of construction of the work holder.
Figure 4:
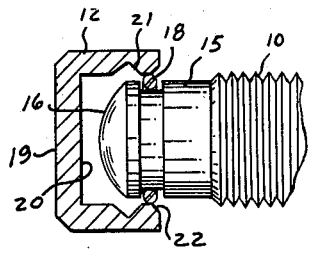
Fig. 4 is a view similar to Fig. 3, but showing the pad or cap in the act of being installed or removed from the supporting member.

Referring to Figs. 3 and 4, there is shown therein the internal construction and the means and mode of assembly of the cap 12 upon the screw shaft 10 of the work holder. As shown, the shaft 10 has a terminal portion 15 of reduced diameter with the end 16 thereof being approximately semi-spherical in contour. Closely adjacent to the hemispherical end 16 is a neck portion 17 of smaller diameter than the terminal portion 15. Located within the neck area 17 is a freely supported compression spring or lock ring 18. The normal diameter of such lock ring 18 is such that it will not pass over the terminal portion 15 of the shaft 10 but is nevertheless free and loose with respect to the neck portion 17.

The cap or pad 12 is generally circular in shape having a flat planar end surface 19 and is recessed as at 20 so as to receive the end 16 of the threaded stem 10. The side wall of the internal recess 20 is peripherally grooved as at 21 to provide a seat having divergently inclined surfaces for receiving the spring lock ring 18 when assembled. The outer edge of the recess is chamfered or otherwise cut back as at 22 so as to provide a means for inserting the shaft 10 and its associated lock ring 18 into the recess 20 of the cap 12.

In assembling the cap 12 to the shaft 10 it is only necessary to press cap 12 over the end 15 of the shaft 10. As shown in Fig. 4 such relative movement of the shaft 10 and cap 12 toward one another causes the spring retainer 18 to be compressed within the neck 17 thereby permitting passage of the cap 12 over the spring retainer 18. As soon as the groove 21 comes into alignment with the neck 17 the spring retainer 18 again expands into the groove 21 thereby retaining the cap 12 in assembled position upon the end of the shaft 10. The chamfered or cut away surface 22 acts as a cam to compress the spring ring 18 into the neck 17. For withdrawal of cap 12 from the shaft 10 the inclined surface of the groove 21 likewise acts as a cam compressing the spring retainer ring 18 into the neck 17 to permit withdrawal of the cap 12 from the end of the shaft 10.

When assembled on the shaft 10, as shown in Fig. 3, the cap 12 is free for universal motion within limits of about 10° tilting one way or the other relative to the axis of the shaft 10 and the cap is also free for rotation relative to the shaft 10. Rocking motion of the cap 12 is permitted by the clearance between the spring ring 18 and the shoulders or sides of the neck portion 17 on the shaft in conjunction with the clearance afforded by the groove 21. It will be noted that thrust is taken directly by metal contact of the hemispherical end 16 and the internal surface of the recess 20. No thrust or load is taken by the floating spring ring 18 and its free sliding engagement within the groove 21.

While the cap 12 is securely maintained in assembled position upon the end of the shaft 10, it is nevertheless readily removable therefrom when such removal is desired by the user. To remove the cap from the shaft 10 it is only necessary to move the cap and shaft relative to one another in opposite directions, whereupon the spring 18 is again compressed through the camming influence of the groove 21 so that the cap may be withdrawn past the spring 18 while it is compressed within the neck 17 of the shaft 10.

Figure 5:
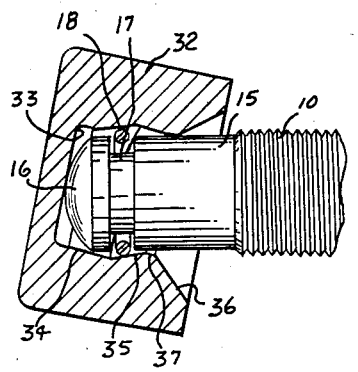
Fig. 5 is similar to Figs. 3 and 4, but showing a slightly modified form of construction.

The disclosure of Fig. 5 represents a slight modification in the manufacture of the cap 12. In this form of construction the cap 32 is provided with a recess 33 the side walls of which are reversely tapered or inclined as at 34—35. The open end of the cap is likewise cut back at 36 similar to the cut back 22 of the cap 12. This construction also provides a land 37 intermediate the taper 35 and the cut back surface 36 which retains the cap 32 on the end of the shaft 10. This construction permits a slightly greater wobble motion of the cap 32 than can be obtained with the construction shown in Figs. 3 and 4. Otherwise the construction is identical to that heretofore described and the caps are mounted on and removed from the shaft 10 in the same manner as previously explained.

From the above description it will be apparent that there is thus provided a device of the character described possessing the particular features of advantage before enumerated as desirable, but which obviously is susceptible of modifications in its form, proportions, detail construction and arrangement of parts without departing from the principle involved or sacrificing any of its advantages.

While in order to comply with the statute the invention has been described in language more or less specific as to structural features, it is to be understood that the invention is not limited to the specific features shown, but that the means and construction herein disclosed comprise but one of several modes of putting the invention into effect, and the invention is therefore claimed in any of its forms or modifications within the legitimate and valid scope of the appended claim.

Having thus described my invention, I claim:

A work holder including, a mounting means, a shaft threadedly engaged through said mounting means, said shaft having an axially extended portion uniformly reduced in external dimension below the periphery of the shaft and of the shaft adjacent and spaced inwardly of one end and forming an annular slot with a bottom wall parallel to the shaft axis and straight side walls radially extending, said one end of said shaft having a hemispherical extremity, a cap having a bore receiving said one end of said shaft, said bore having a bottom engaging said hemispherical extremity and a skirt encircling said end of the shaft including the uniformly reduced portion, the outermost surface of the closed end of said cap providing a work engaging surface and the opposite end of said cap having the bore beveled and flaring outwardly, the interior peripheral wall of the bore of said cap being concentric with and spaced outwardly from said shaft, the bore of said cap having an axially expanded obtuse V-shaped recess in its inner wall the ends of which are formed by two angularly disposed planar surfaces, said V-shaped recess overlying said reduced portion of said shaft and a normally expanded resilient ring member about said uniformly reduced portion of said shaft seated in said reduced portion and such V-shaped recessed portion and longitudinally contained within the axial limits thereof, said ring member being biased within said recess in the inner wall of said cap to retain said cap to said shaft yet afford a high degree of adjustment of said cap relative said shaft, enabling a wide range of selective positioning thereof for application to and positioning of a work piece.

References Cited in the file of this patent

UNITED STATES PATENTS

| | | |
|---|---|---|
| 880,948 | Wilhelm et al. | Mar. 3, 1908 |
| 1,036,386 | Von Denburg | Aug. 20, 1912 |
| 1,184,496 | Stenvall | May 23, 1916 |
| 1,421,133 | Albertson | June 27, 1922 |
| 2,236,913 | Merrill | Apr. 1, 1941 |
| 2,397,371 | Reynolds | Mar. 26, 1946 |
| 2,498,696 | Middaugh | Feb. 28, 1950 |
| 2,585,594 | Snyder | Feb. 12, 1952 |
| 2,649,123 | Gulland | Aug. 18, 1953 |
| 2,699,190 | Packer | Jan. 11, 1955 |
| 2,705,441 | Armstrong | Apr. 5, 1955 |
| 2,724,297 | Mercer | Nov. 22, 1955 |
| 2,729,126 | Stanton | Jan. 3, 1956 |

FOREIGN PATENTS

| | | |
|---|---|---|
| 841,587 | France | Feb. 13, 1939 |